United States Patent
Wu et al.

(10) Patent No.: US 12,431,710 B2
(45) Date of Patent: Sep. 30, 2025

(54) SCALABLE POWER DISTRIBUTION SYSTEM AND METHOD

(71) Applicant: Delta Electronics, Inc., Taipei (TW)

(72) Inventors: Chien-Lung Wu, Raleigh, NC (US); I-Chieh Li, Taipei (TW); Yu-Chi Jen, Taipei (TW); Yen-Chun Wang, Taipei (TW); Hui-Ru Chen, Taipei (TW)

(73) Assignee: Delta Electronics, Inc., Taipei (TW)

( * ) Notice: Subject to any disclaimer, the term of this patent is extended or adjusted under 35 U.S.C. 154(b) by 0 days.

(21) Appl. No.: 18/679,155

(22) Filed: May 30, 2024

(65) Prior Publication Data

US 2024/0405553 A1    Dec. 5, 2024

Related U.S. Application Data

(60) Provisional application No. 63/470,685, filed on Jun. 2, 2023.

(51) Int. Cl.
  *H02J 3/02*    (2006.01)
  *H02J 1/00*    (2006.01)
  *H02J 4/00*    (2006.01)

(52) U.S. Cl.
  CPC ............. *H02J 3/02* (2013.01); *H02J 1/001* (2020.01); *H02J 4/00* (2013.01)

(58) Field of Classification Search
  CPC .... H02J 1/001; H02J 1/08; H02J 1/084; H02J 1/086; H02J 1/10; H02J 1/102; H02J 3/02; H02J 4/00; G06F 1/26; G06F 1/263; G06F 1/266
  See application file for complete search history.

(56) References Cited

U.S. PATENT DOCUMENTS

| | | |
|---|---|---|
| 2012/0087051 A1 | 4/2012 | Spitaels et al. |
| 2012/0187760 A1 | 7/2012 | Cheng et al. |
| 2015/0177797 A1 | 6/2015 | Butzer et al. |
| 2016/0165744 A1 | 6/2016 | Bailey et al. |
| 2016/0226254 A1 | 8/2016 | Cheng et al. |
| 2018/0138703 A1* | 5/2018 | Chan ................ G06F 1/263 |

(Continued)

FOREIGN PATENT DOCUMENTS

| | | |
|---|---|---|
| CA | 2349058 A1 | 11/2001 |
| CN | 113541298 A | 10/2021 |

(Continued)

*Primary Examiner* — Long Nguyen
(74) *Attorney, Agent, or Firm* — KIRTON McCONKIE; Evan R. Witt

(57) ABSTRACT

The present disclosure provides a scalable power distribution system including a power distribution device, the power distribution includes a plurality of input modules and a plurality of output modules. The input module includes a connector for receiving the input power. The output module has a plurality of output ports. The output module receives the input power of the connector of the corresponding input module, or receives the input power of the connector of the input module neighboring to the corresponding input module. The input module receives the plural types of input power, and the power distribution system selectively receives one or more times of the input power through one or more of the plurality of input modules to provide one or more times of the output power to one or more of the plurality of output ports.

23 Claims, 11 Drawing Sheets

(56) References Cited

U.S. PATENT DOCUMENTS

2018/0145508 A1* 5/2018 Chan .................. H02J 3/00
2022/0013994 A1   1/2022 French et al.

FOREIGN PATENT DOCUMENTS

| JP | H04359676 A  | 12/1992 |
| JP | 2002058246 A |  2/2002 |
| JP | 2017117202 A |  6/2017 |
| TW |  201339817 A | 10/2013 |
| WO | 2023036959 A1 |  3/2023 |

* cited by examiner

SCALABLE POWER DISTRIBUTION SYSTEM AND METHOD

CROSS-REFERENCE TO RELATED APPLICATION

This application claims the benefit of U.S. Provisional Application No. 63/470,685, filed on Jun. 2, 2023, entitled "SCALE-UP UNIVERSAL PDU SYSTEM FOR SUPPORTING DIFFERENT INPUT TYPES". The entire contents of the above-mentioned patent application are incorporated herein by reference for all purposes.

FIELD OF THE INVENTION

The present disclosure relates to a power distribution system and a power distribution method, and more particularly to a scalable power distribution system and a power distribution method.

BACKGROUND OF THE INVENTION

In the conventional techniques, the power distribution system receives an input power and provides an output power to electronic equipment such as servers, storage devices or network equipment.

The conventional power distribution system has one input port and a plurality of output ports for receiving input power and outputting output power respectively. However, since the conventional power distribution system only has one input port which can only receive single type of input power, using powers of different types requires different power distribution systems having input ports compliant with corresponding types. In other words, a single power distribution system is not compatible with all types of powers. In addition, since conventional power distribution system only has a single input port with limited input power range, the range of the output power is limited. Consequently, the number of electronic devices connected to the power distribution system cannot be expanded.

Therefore, there is a need of providing a scalable power distribution system and method to obviate the drawbacks encountered from the prior arts.

SUMMARY OF THE INVENTION

It is an object of the present disclosure to provide a scalable power distribution system and a power distribution method. The power distribution system and method of the present disclosure are capable of receiving plural types of input power, thereby improving the compatibility with regard to the input power. In addition, the power distribution system and method of the present disclosure are capable of receiving a plurality of input power simultaneously for increasing the scale of the output power, thereby improving the scalability of electronic equipment connected to the power distribution system.

In accordance with an aspect of the present disclosure, there is provided a scalable power distribution system configured to receive an input power of one of plural types and to provide a plurality of output voltage ranges. The power distribution system includes a power distribution device. The power distribution device includes a plurality of input modules and a plurality of output modules. Each of the plurality of input modules includes a connector, and the connector is configured to receive the input power and is electrically connected to at least one neighboring input module of the plurality of input modules. The plurality of output modules are electrically connected to the plurality of input modules respectively. Each of the plurality of output modules has a plurality of output ports, and each of the plurality of output module receives the input power received by the connector of a corresponding input module of the plurality of input modules, or receives the input power received by the connector of an input module, among the plurality of input modules, neighboring to the corresponding input module, and each of the plurality of output modules outputs an output power according to the input power. The plurality of input modules may adaptively receive input power from a plurality of types, and the power distribution system may selectively receive one or more times of the input power through one or more of the plurality of input modules to provide one or more times of the output power to one or more of said output ports.

In accordance with an aspect of the present disclosure, there is provided a power distribution method, including: providing a power distribution system including a power distribution device, wherein the power distribution device includes a plurality of input modules and a plurality of output modules correspondingly. Each of the plurality of input modules includes a connector, the connector is electrically connected to a neighboring input module of the plurality of input modules; receiving an input power by the connector of at least one of the input modules; receiving the input power by at least one output module from the connector of the corresponding input module or the connector of the input module neighboring to the corresponding input module; and providing the output power by the output module according to the input power. Each of the plurality of input modules adaptively receives the input power of plural types, and the power distribution system selectively receives one or more times of the input power through one or more of the plurality of input modules to provide one or more times of the output power to one or more of the plurality of output modules.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1:
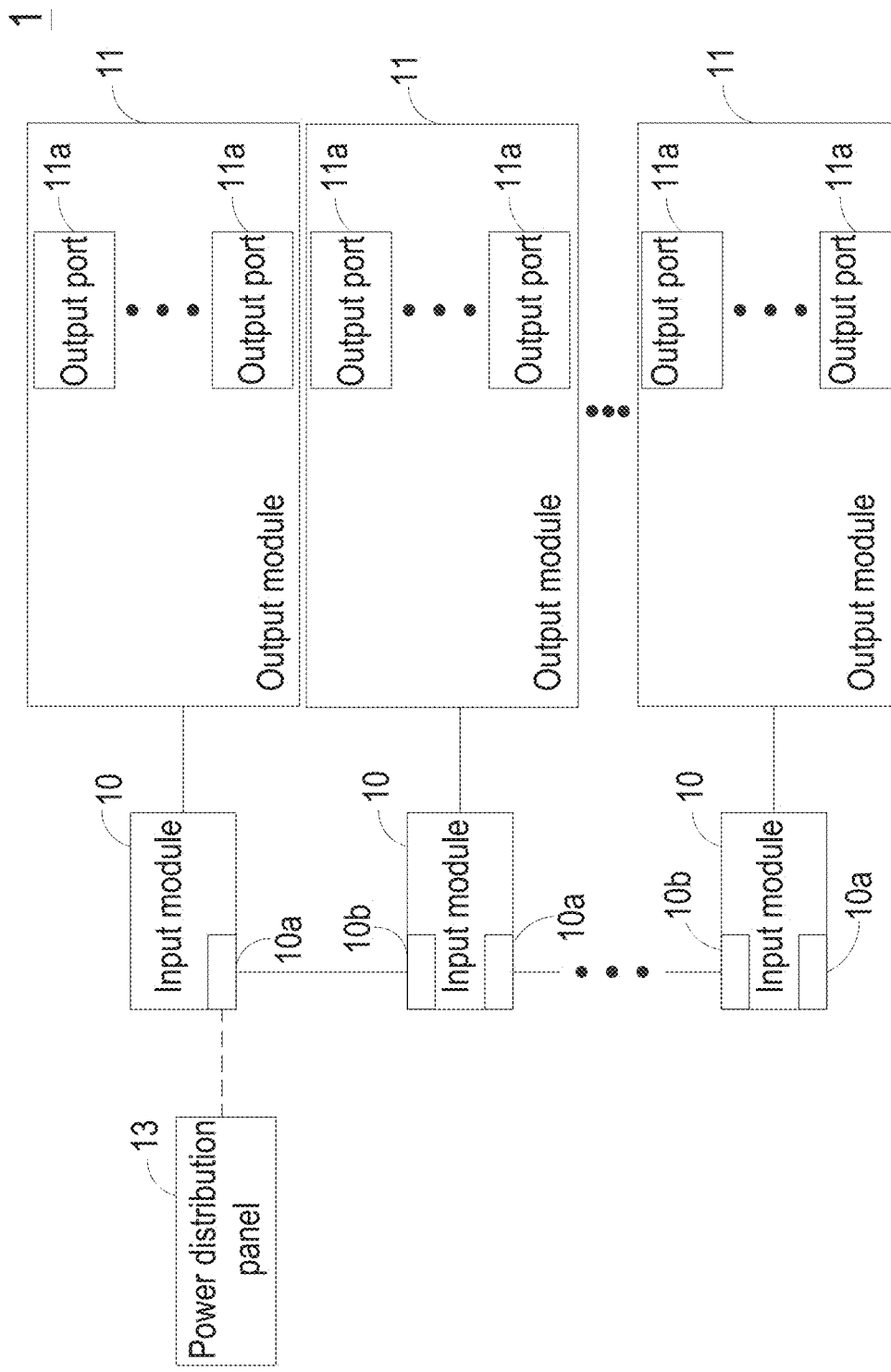
FIG. 1 is a schematic system diagram illustrating a scalable power distribution system according to an embodiment of the present disclosure.

FIG. 1 is a schematic system diagram illustrating a scalable power distribution system 1 according to an embodiment of the present disclosure. As shown in FIG. 1, the power distribution system 1 is configured to receive an input power chosen from one of plural types and to provide a plurality of output voltage ranges. The plural types of input power at least include single-phase power, three-phase delta (Delta) power, three-phase star (Y) power and DC power. The power distribution system 1 includes a power distribution device which includes a plurality of input modules 10 and a plurality of output modules 11. Each input module 10 includes a connector 10a configured to receive the input power and is electrically connected to at least one neighboring input module 10. The plurality of output modules 11 are electrically connected to the plurality of input modules 10 respectively. The output module 10 has a plurality of output ports 11a. The output module 11 receives the input power received by the connector 10a of the corresponding input module 10, or receives the input power received by the connector 10a of the input module 10 neighboring to the corresponding input module 10. The output module 11 outputs the output power according to the input power. The input module 10 is configured to adaptively receive the input power in plural types, and the power distribution system 1 may selectively receive one or more times of the input power through one or more of the plurality of input modules 10 to provide one or more times of the output power to one or more of the plurality of output ports 11a. The plurality of output ports 11a of the power module 11 are electrically connected to a plurality of external electrical devices respectively, and the power module 11 provides the output power to the plurality of external electrical devices through the output ports 11a. The external electrical device is, for example but not limited to, a power supply unit (PSU), a server or other electrical device. In an embodiment, the amount of the plurality of input modules 10 is equal to the amount of the plurality of output modules 11. The amount of the plurality of the input modules 10 and/or the amount of the plurality of the output modules 11 are determined by at least one of below factors: user design, the maximum power requirement of the application scenario, the specification of the power distribution system 1, the power specifications of the external electrical devices connected to the power distribution system 1, and the power specifications of the input power.

The power distribution system of the present disclosure is capable of receiving plural types of input power, thereby improving the compatibility with regard to the input power. In addition, the power distribution system of the present disclosure is capable of receiving a plurality of input power simultaneously for increasing the scale of the output power, thereby improving the scalability of electronic equipment connected to the power distribution system.

In an embodiment, each of the input module 10 further includes a slot 10b, and the power distribution system 1 further includes a power distribution panel (PDP) 13. The connector 10a of the input module 10 is electrically connected to the slot 10b of a neighboring input module 10 so that neighboring input modules 10 are electrically connected to each other. The power distribution panel 13 is configured to provide the input power and is detachably connected to the connector 10a of the input module 10. The power distribution panel 13 is configured to provide the input power to the corresponding output module 11 through the connector 10a so that the output module 11 outputs the output power according to the input power. In an embodiment, the output module 11 only receives the input power from one power distribution panel 13.

In an embodiment, the total output power of the power distribution system 1 is proportional to the amount of the power distribution panels 13 connected to the plurality of input modules 10.

In an embodiment, the power distribution panel 13 is configured to be selectable or replaceable according to the types of the input power. The plural types of input power that can be selected or replaced at least include single-phase power, three-phase delta (Delta) power, three-phase star (Y) power and DC power. In an embodiment, when a plurality of power distribution panels 13 are electrically connected to the plurality of input modules 10 respectively, the input power of all of the plurality of power distribution panels 13 is of the same type. In an embodiment, the amount of the power distribution panels 13 is equal to or less than the amount of the plurality of output modules 11.

Figure 2:
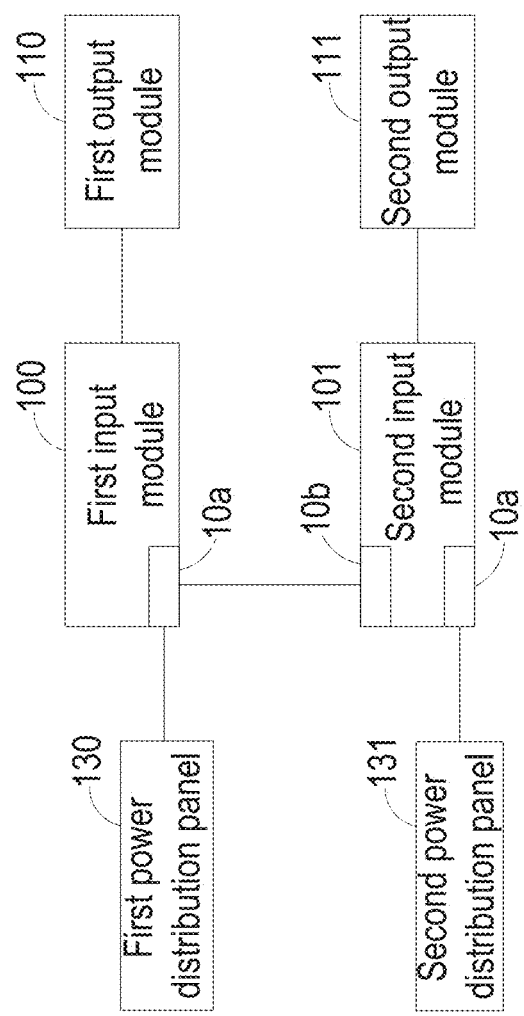
FIG. 2 is a schematic system diagram illustrating a scalable power distribution system according to another embodiment of the present disclosure.

The amount of the input modules, the output modules and the power distribution panels may be adjusted according to actual demands and are not limited. FIG. 2 illustrates an exemplary embodiment of the power distribution system which includes two input modules, two output modules and two power distribution panels. The elements of FIG. 2 that are similar with those of FIG. 1 are represented by the same reference numerals, and the detailed description thereof is omitted herein.

In the embodiment of FIG. 2, the plurality of input modules 10 include a first input module 100 and a second input module 101, the plurality of output modules 11 include a first output module 110 and a second output module 111, and the power distribution panels 13 include a first power distribution panel 130 and a second power distribution panel 131. When the connector 10a of the first input module 100 is electrically connected to the first power distribution panel 130, the connector 10a of the first input module 100 provides the input power provided by the first power distribution panel 130 to the corresponding first output module 110. When the connector 10a of the second input module 101 is electrically connected to the second power distribution panel 131, the connector 10a of the second input module 101 provides the input power provided by the second power distribution panel 131 to the corresponding second output module 111. The total output power of the power distribution system 1a is the sum of the input powers of the first power distribution panel 130 and the second power distribution panel 131.

In an embodiment, the power distribution system further includes a jumper unit which allows the output module 11 to receive the input power received by the connector 10a of the input module 10 neighboring to the corresponding input module 10. The jumper unit is detachably connected to the slot 10b of the input module 10 for electrically connecting to the corresponding connector 10a. The jumper unit is configured to form an electrical loop connection between the corresponding input module 10 and the input module 10 neighboring to the corresponding input module 10, thereby allowing corresponding output module 11 to receive the input power received by the input module 10 neighboring to the corresponding input module 10. In an embodiment, the input power provided by the power distribution panel 13 is transmitted along a first arrangement direction through one or more of a plurality of jumper units to the connector 10a of one or more of a plurality of consecutively neighboring input modules 10 arranged along the first arrangement direction. In an embodiment, the input module 10 neighboring to the input module 10 connected to the jumper unit has to be connected to the power distribution panel 13 or the jumper unit.

The embodiment of the power distribution panel 13 providing input voltages to two output modules 11 through the jumper unit is exemplified as follows according to FIG. 3. The embodiment of the power distribution panel 13 providing input voltages to three output modules 11 through the jumper units is exemplified as follows according to FIG. 4. The amount of the jumper units and the output modules are not limited. The elements of FIGS. 3 and 4 that are similar with those of FIGS. 1 and 2 are represented by the same reference numerals, and the detailed description thereof is omitted herein.

Figure 3:
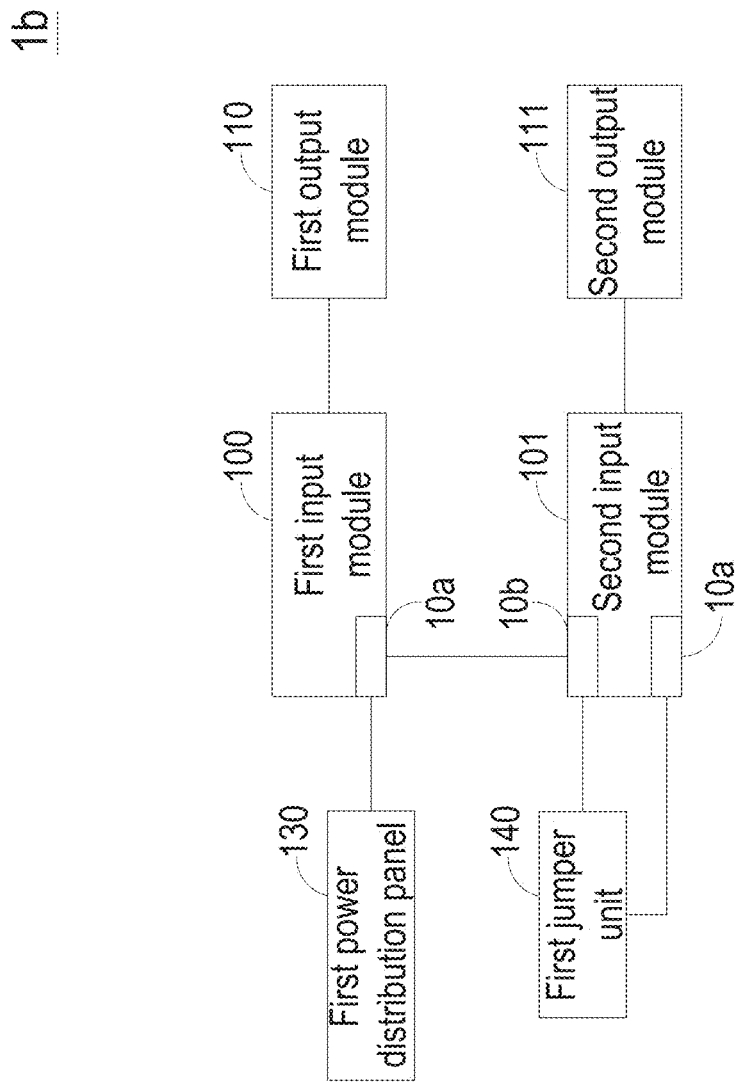
FIG. 3 is a schematic system diagram illustrating a scalable power distribution system according to another embodiment of the present disclosure.

Please refer to the power distribution system 1b shown in FIG. 3. In this embodiment, the plurality of input modules 10 include a first input module 100 and a second input module 101, the plurality of output modules 11 include a first output module 110 and a second output module 111. The power distribution panel 13 includes a first power distribution panel 130, and the jumper unit includes a first jumper 140. When the connector 10a of the first input module 100 is electrically connected to the first power distribution panel 130, and the slot 10b of the second input module 101 neighboring to the first input module 100 is electrically to the first jumper unit 140, the connector 10a of the first input module 100 provides the input power provided by the first power distribution panel 130 to the corresponding first output module 110. The connector 10a of the second input module 101 and the connector 10a of the first input module 100 form an electrical loop connection through the first jumper unit 140. The input power provided by the first power distribution panel 130 is provided to the second output module 111 through the connector 10a of the second input module 101. The total output power of the power distribution system 1b is the input power of the first power distribution panel 130.

Figure 4:
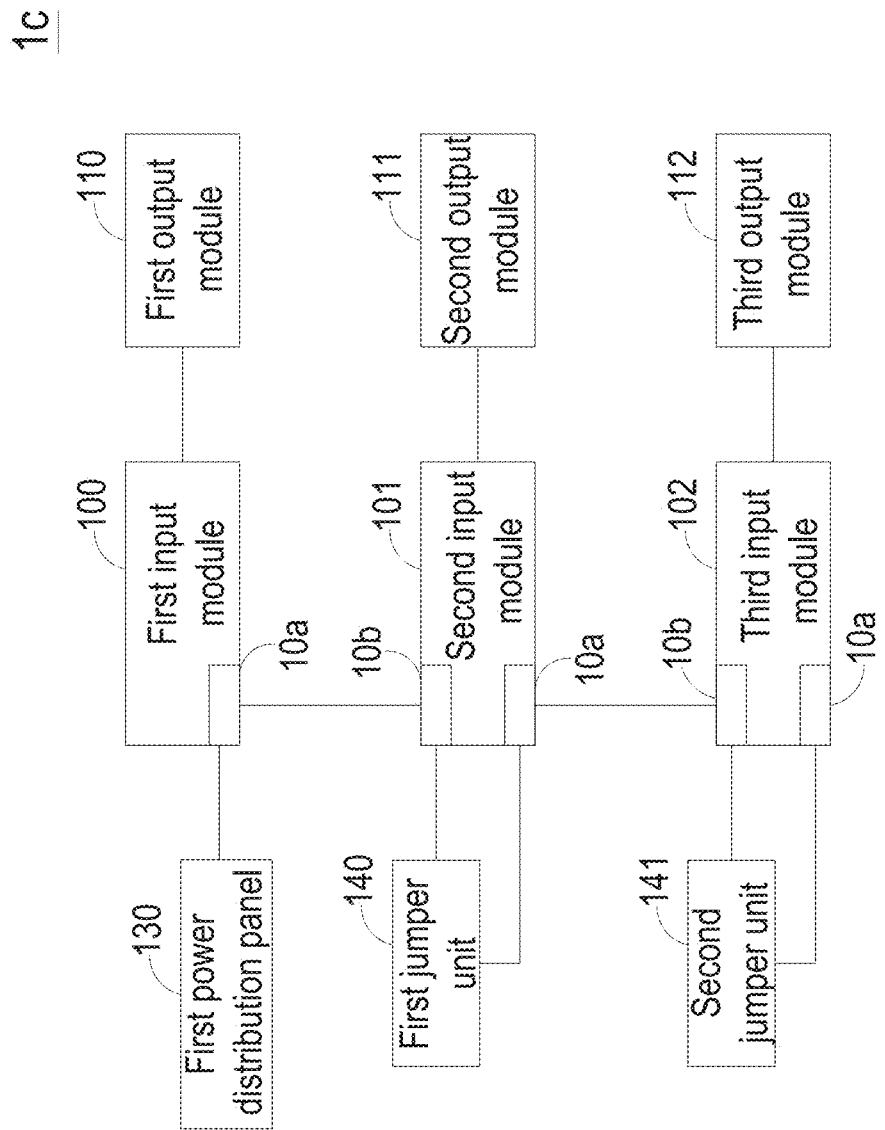
FIG. 4 is a schematic system diagram illustrating a scalable power distribution system according to another embodiment of the present disclosure.

Please refer to the power distribution system 1c shown in FIG. 4. In this embodiment, the plurality of input modules 10 include a first input module 100, a second input module 101 and a third input module 102, the plurality of output modules 11 include a first output module 110, a second output module 111 and a third output module 112, and the jumper units include a first jumper unit 140 and a second jumper unit 141. When the slot 10b of the third input module 102 neighboring to the second input module 101 is electrically connected the second jumper unit 141, the connector 10a of the third input module 102 and the connector 10a of the first input module 100 form an electrical loop connection through the second jumper unit 141, the first jumper unit 140 and the connector 10a of the second input module 101. The input power provided by the first power distribution panel 130 is provided to the third output module 112 through the connector 10a of the third input module 102.

In the present disclosure, the amount of the jumper units and the amount of the power distribution panels may be adjusted according to actual demands and are not limited. In an embodiment, different power distribution panels 13 and different jumper units are detachably assembled to the plurality of input modules 10 of the power distribution system 1 respectively, thereby improving the scalability of the power distribution system 1. For example, the plurality of input modules 10 and the plurality of output modules 11 are immovable devices, and the plurality of input modules 10 may be connected to different power distribution panels 13 and jumper units by changing the connections between the input modules 10 and the power distribution panels 13 and jumper units.

Figure 5:
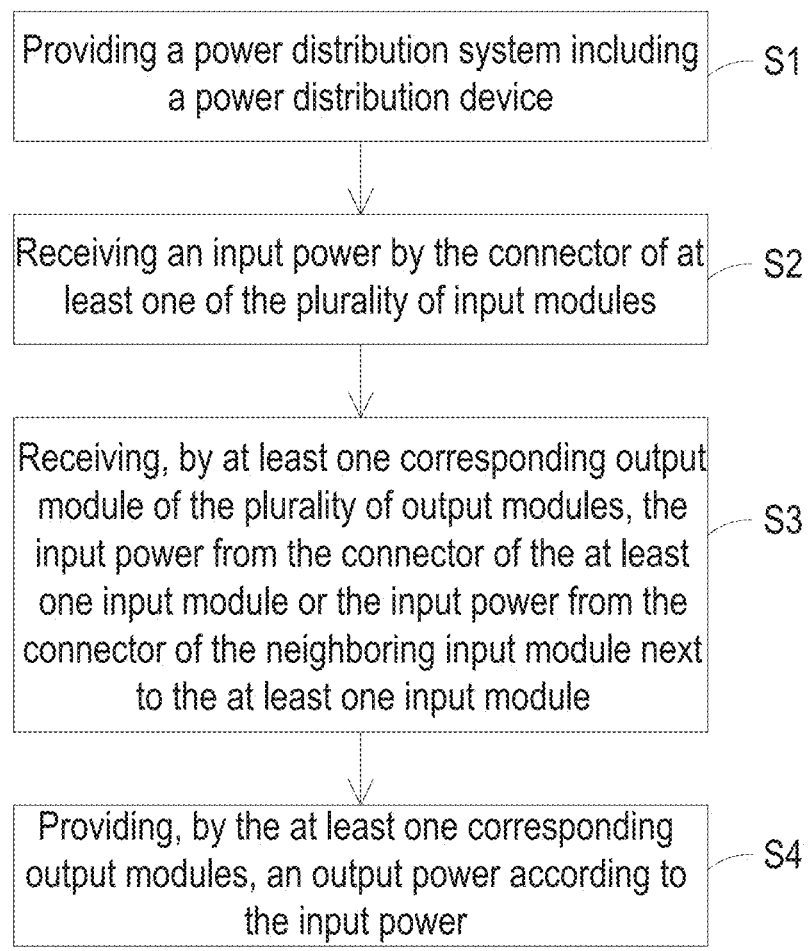
FIG. 5 is a schematic flow chart illustrating a power distribution method according to an embodiment of the present disclosure.

FIG. 5 is a schematic flow chart illustrating a power distribution method according to an embodiment of the present disclosure. The power distribution method of the present disclosure is applicable for the scalable power distribution systems 1, 1a, 1b and 1c stated above. Please refer to FIGS. 1 and 5, the power distribution method of the present disclosure includes steps S1, S2, S3 and S4. In the step S1, a power distribution system 1 including a power distribution device is provided. The power distribution device includes a plurality of input modules 10 and a plurality of output modules 11 correspondingly. Each input module 10 includes a connector 10a electrically connected to a neighboring input module 10. In the step S2, the input power is received by the connector 10a of at least one of the input modules 10. In the step S3, the input power from the connector 10a of the corresponding input module 10 or from the connector 10a of the input module 10 neighboring to the corresponding input module 10 is received by at least one of the output modules 11. In the step S4, the output power is provided by at least one of the output modules 11 according to the input power. The input module 10 is configured to adaptively receive the input power of one of plural types, and the power distribution system 1 may selectively receive one or more times of input power through one or more of the plurality of input modules 10 to provide one or more times of output power to one or more of the plurality of output modules 11.

In an embodiment, the method of the present disclosure further includes steps of: providing a power distribution panel 13, wherein the power distribution panel 13 is configured to provide the input power and is detachably connected to the connector 10a of at least one of the input modules 10; and providing the input power to corresponding output module 11 by the connector 10a so that the output module 11 outputs the output power according to the input power.

Figure 6:
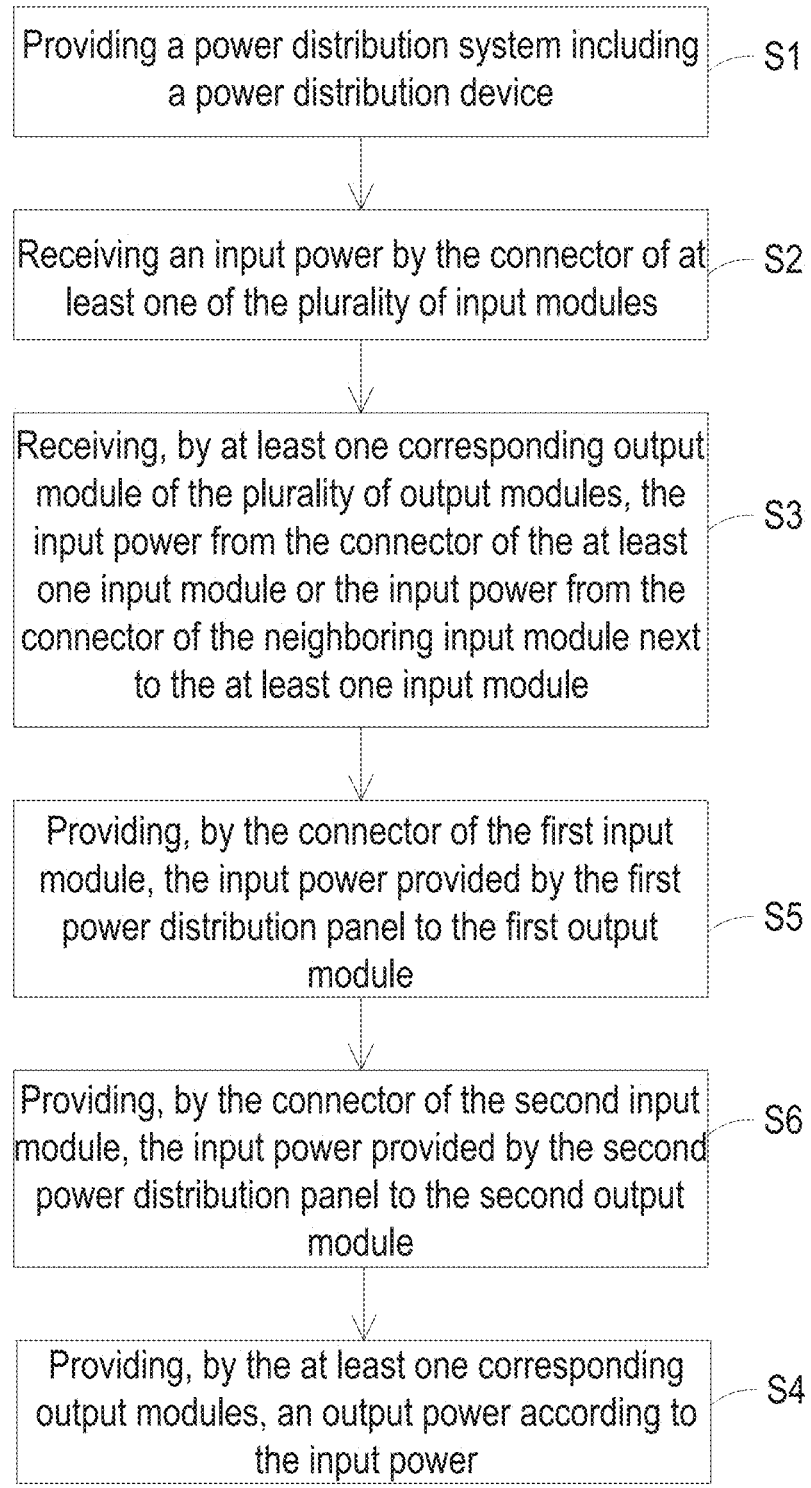
FIG. 6 is a schematic flow chart illustrating a power distribution method according to another embodiment of the present disclosure.

Please refer to FIGS. 2 and 6. In this embodiment, the method of the present disclosure further includes steps S5 and S6. In the step S5, the input power provided by a first power distribution panel 130 is provided to the corresponding first output module 110 by the connector 10a of the first input module 100. In the step S6, the input power provided by a second power distribution panel 131 is provided to corresponding second output module 111 by the connector 10*a* of the second input module 101. The total output power of the power distribution system 1*a* is the sum of the input powers of the first power distribution panel 130 and the second power distribution panel 131.

In an embodiment, the method of the present disclosure further includes steps of: providing a jumper unit, wherein the jumper unit is detachably connected to a slot 10*b* of the input module 10 for electrically connecting to the corresponding connector 10*a*; and utilizing the jumper unit to form an electrical loop connection between the corresponding input module 10 and the input module 10 neighboring to the corresponding input module 10, thereby allowing the output module 11 to receive the input power received by the input module 10 neighboring to the corresponding input module 10.

Figure 7:
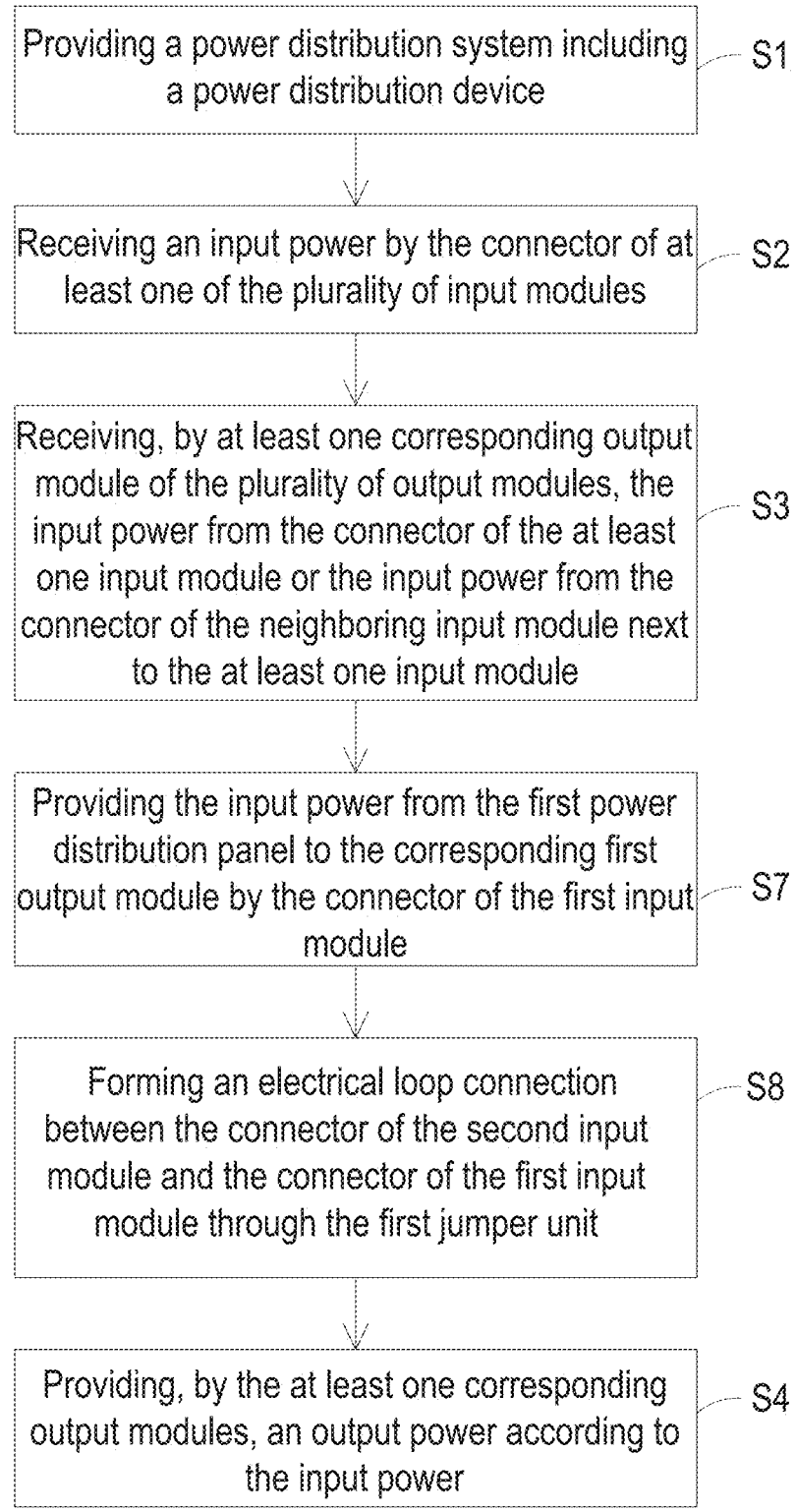
FIG. 7 is a schematic flow chart illustrating a power distribution method according to another embodiment of the present disclosure.

Please refer to FIGS. 3 and 7. In this embodiment, the method of the present disclosure further includes steps S7 and S8. In the step S7, the input power provided by the first power distribution panel 130 is provided to the corresponding first output module 110 by the connector 10*a* of the first input module 100. In the step S8, the connector 10*a* of the second input module 101 and the connector 10*a* of the first input module 100 are utilized to form an electrical loop connection through the first jumper unit 140, and the input power provided by the first power distribution panel 130 is provided to the second output module 111 through the connector 10*a* of the second input module 101. The total output power of the power distribution system is the input power of the first power distribution panel 130.

Figure 8:
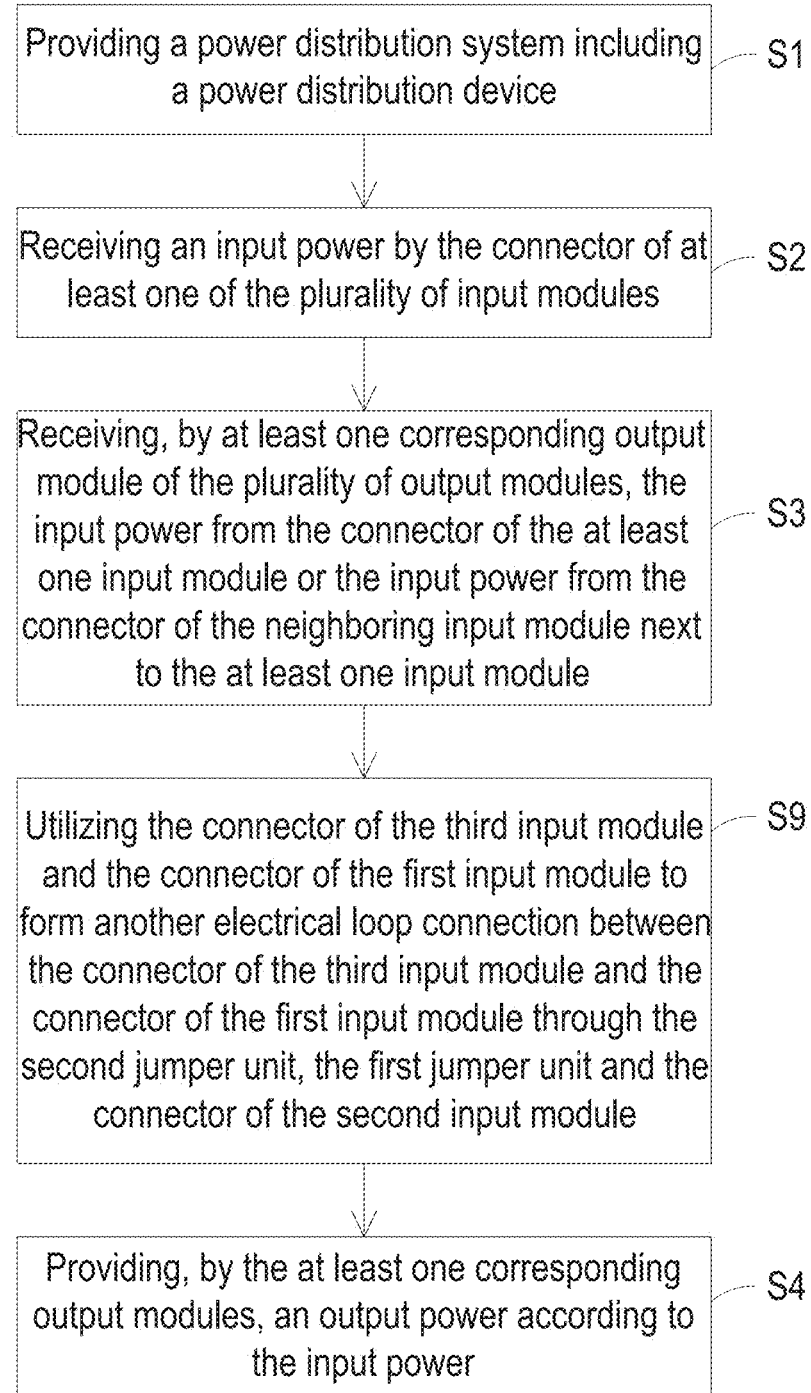
FIG. 8 is a schematic flow chart illustrating a power distribution method according to another embodiment of the present disclosure.

Please refer to FIGS. 4 and 8. In this embodiment, the method of the present disclosure further includes steps S9. In the step S9, the connector 10*a* of the third input module 102 and the connector 10*a* of the first input module 100 are utilized to form an electrical loop connection through the second jumper unit 141, the first jumper unit 140 and the connector 10*a* of the second input module 101, and the input power provided by the first power distribution panel 130 is provided to the third output module 112 through the connector 10*a* of the third input module 102.

Figure 9:
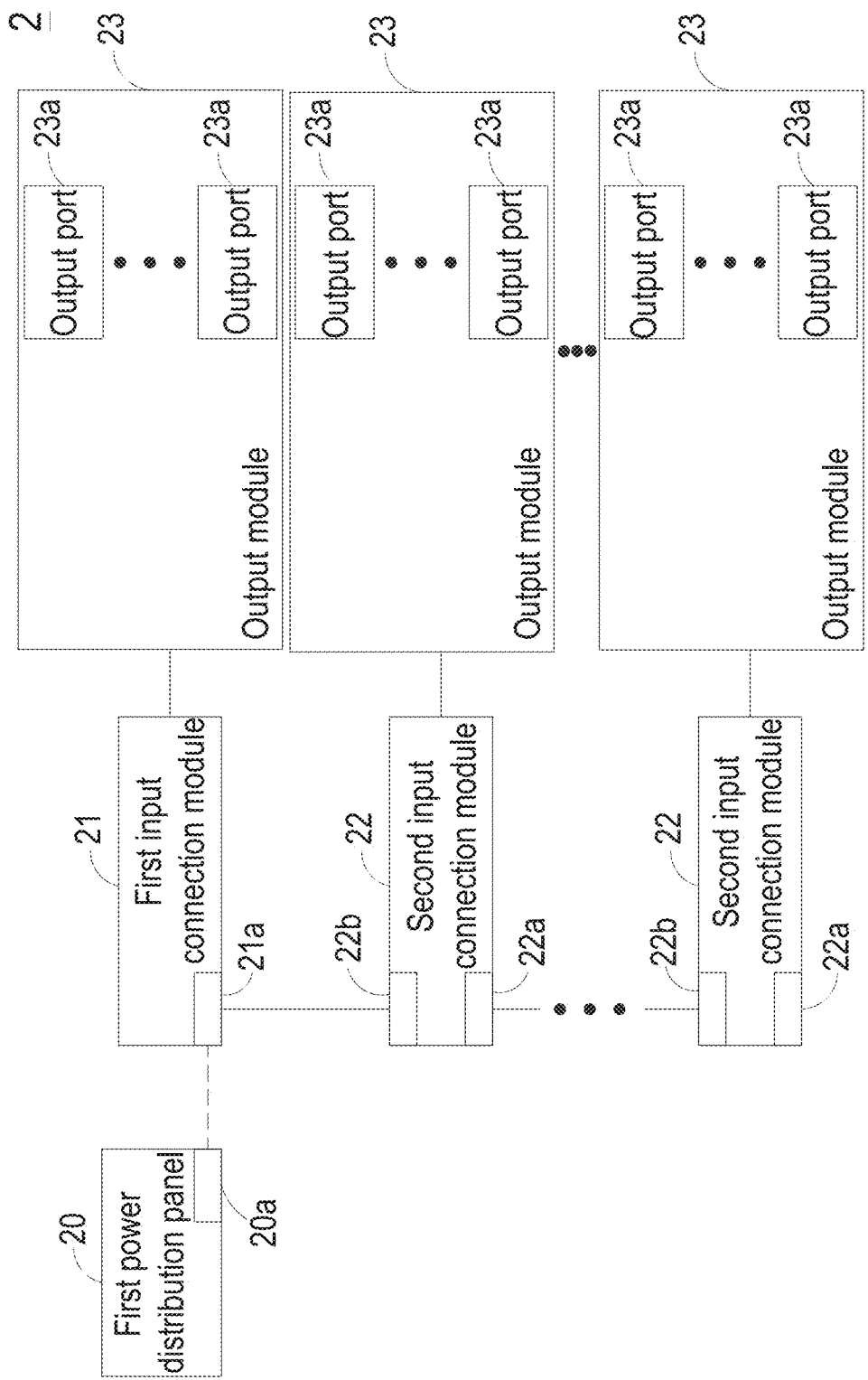
FIG. 9 is a schematic system diagram illustrating a scalable power distribution system according to another embodiment of the present disclosure.

FIG. 9 is a schematic system diagram illustrating a scalable power distribution system 2 according to another embodiment of the present disclosure. As shown in FIG. 9, the power distribution system 2 is disposed on a rack (not shown) and is configured to receive an input power of one of the plural types. The power distribution system 2 includes a first power distribution panel 20, a first input connection unit 21, at least one second input connection unit 22 and a plurality of output modules 23. The first power distribution panel 20 is connected to an external power source for providing the input power. The plural types of input power at least include the single-phase power, three-phase delta (Delta) power, three-phase star (Y) power and DC power. The first input connection unit 21 is detachably connected to the first power distribution panel 20 and receives the input power provided by the first power distribution panel 20. The second input connection unit 22 is connected to the first input connection unit 21, or the first input connection unit 21 and another second input connection unit 22 for receiving the input power. The plurality of output modules 23 are electrically connected to one of the first input connection unit 21 and the second input connection unit 22 respectively. Each of the output modules 23 has a plurality of output ports 23*a*. Each output module 23 receives the input power provided by the corresponding first input connection unit 21 or the second input connection unit 22, and provides the output power to corresponding output port 23*a*. Each output module 23 provides the output power to a plurality of external electrical devices (not shown) disposed on the rack through the plurality of output ports 23*a*. The input power provided by the first power distribution panel 20 is transmitted to the first input connection unit 21, or the first input connection unit 21 and the second input connection unit 22, and the output module 23 receiving the input power provides the output power to the corresponding output port 23*a*. The first power distribution panel 20 is adaptively connected to any one of the plural types of external power sources so that the first input connection unit 21 or the first input connection unit 21 and the second input connection unit 22 may receive the corresponding type of input power.

The power distribution system of the present disclosure is capable of receiving plural types of input power, thereby improving the compatibility with regard to the input power. In addition, the power distribution system of the present disclosure is capable of receiving a plurality of input power simultaneously for increasing the scale of the output power, thereby improving the scalability of electronic equipment connected to the power distribution system.

Please refer to FIG. 9. The first input connection unit 21 has a first slot 21*a*, and the second input connection unit 22 has a first slot 22*a* and a second slot 22*b*. The first slots 21*a* and 22*a* of the first input connection unit 21 and the second input connection unit 22 are connected to the corresponding output modules 23 respectively.

The first power distribution panel 20 has a first pin 20*a* corresponding to the first slot 21*a* of the first input connection unit 21, and the input power is provided from the first power distribution panel 20 to the corresponding output module 12 through the first pin 20*a* and the first slot 21*a*.

In an embodiment, the second slot 22*b* of each second input connection unit 22 is connected to the corresponding and neighboring output module 23 through the first slot 22*a* of the corresponding second input connection unit 22. The second slot 22*b* of each second input connection unit 22 is connected to the first slot 21*a* of the neighboring first input connection unit 21 or the first slot 22*a* of the second input connection unit 22.

Figure 10:
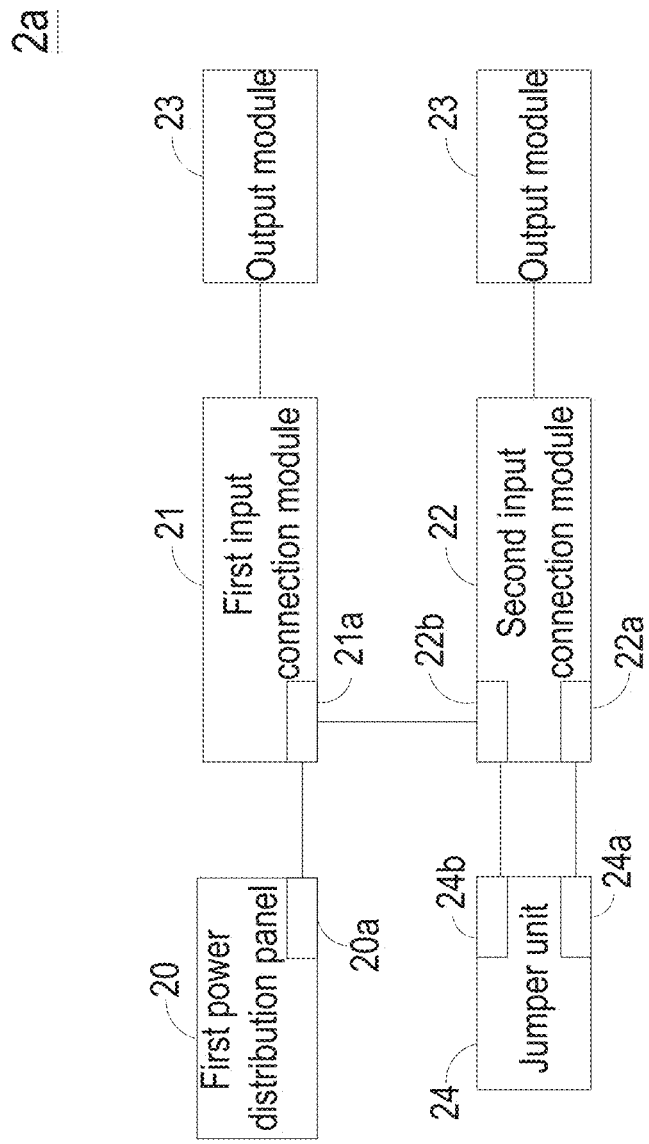
FIG. 10 is a schematic system diagram illustrating a scalable power distribution system according to another embodiment of the present disclosure.

In an embodiment, the power distribution system 2 further includes a jumper unit which allows the output module 23 to receive input power from the first input connection unit 21 or the second input connection unit 22 correspondingly, and to provide the output power to the corresponding plurality of output ports 23*a*. Please refer to the power distribution system 2 in FIG. 10, the elements of FIG. 10 that are similar with those of FIG. 9 are represented by the same reference numerals, and the detailed description thereof is omitted herein. In this embodiment, the jumper unit 24 is connected to the second input connection unit 22 to form an electrical loop connection between the second input connection unit 22 and the first input connection unit 21 neighboring to the second input connection unit 22, thereby allowing the output module 23 corresponding to the second input unit 22 to receive input power from the first power distribution panel 20. The input power received by the output module 23 corresponding to the first input connection unit 21 and the input power received by the output module 23 corresponding to the second input connection unit 22 are provided from the first power distribution panel 20. In an embodiment, the power distribution system 2*a* includes a plurality of second input connection units 22, the second input connection unit 22 connecting to the jumper unit 24 is neighboring to the first input connection unit 21, or neighboring to another second input connection unit neighboring to the first input connection unit 21.

Please refer to FIG. 10 again. The jumper unit 24 has a first pin 24a and a second pin 24b corresponding to the first slot 22a and a second slot 22b of the second input connection unit 22 respectively. The second slot 22b of the second input connection unit 22 is connected to the first slot 21a of the first input connection unit 21 neighboring to the second input connection unit 22. The second input connection unit 22 corresponding to the jumper unit 24 and the first power distribution panel 20 form an electrical loop connection through the first pin 24a and the second pin 24b of the jumper unit 24. In an embodiment, the power distribution system includes a plurality of second input connection unit 22, the second slot 22b of the second input connection unit 22 is connected to the first slot 22a of the neighboring second input connection unit 22.

The amount of the input connection units, the amount of the output module and the amount of the power distribution panel are not limited. The embodiment of a power distribution system including two input connection units, two output module and two power distribution panels is exemplified as follows and shown in FIG. 11. The elements of FIG. 11 that are similar with those of FIG. 9 are represented by the same reference numerals, and the detailed description thereof is omitted herein.

Figure 11:
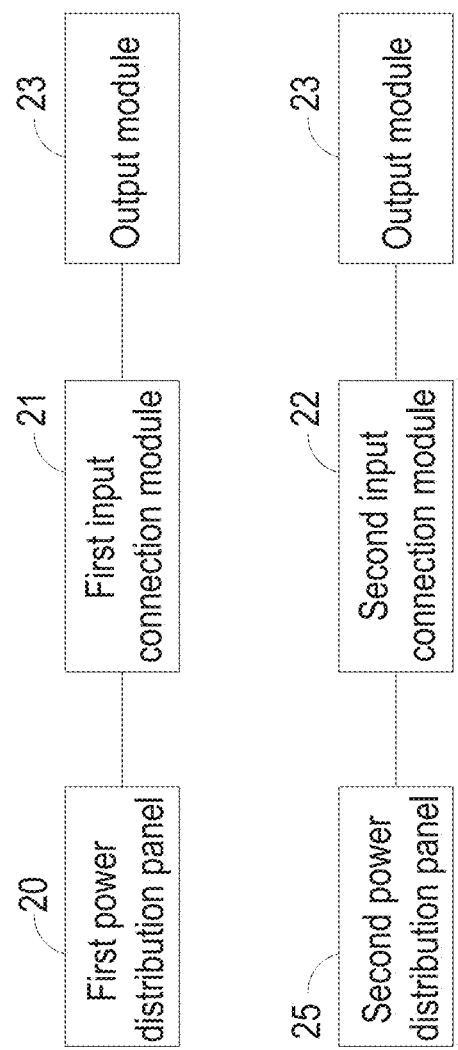
FIG. 11 is a schematic system diagram illustrating a scalable power distribution system according to another embodiment of the present disclosure.

As shown in FIG. 11. In this embodiment, the power distribution system 2b further includes a second power distribution panel 25, the second power distribution panel 25 is detachably connected to the second input connection unit 22 for connecting to an external electric source and providing input power to the corresponding second input connection unit 22. The input power received by the output module 23 corresponding to the first input connection unit 21 is provided from the first power distribution panel 20. The input power received by the output module 23 corresponding to the second input connection unit 22 is provided from the second power distribution panel 25. The total output power of the power distribution system 2b is equal to the sum of the input powers provided by the first power distribution panel 20 and the second power distribution panel 25.

From the above descriptions, the present disclosure provides a scalable power distribution system and a power distribution method. The power distribution system and method of the present disclosure are capable of receiving plural types of input power, thereby improving the compatibility with regard to the input power. In addition, the power distribution system and method of the present disclosure are capable of receiving a plurality of input power simultaneously for increasing the scale of the output power, thereby improving the scalability of electronic equipment connected to the power distribution system.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A scalable power distribution system for receiving input power of one of plural types and providing output in a plurality of voltage ranges, comprising:
   a power distribution device, comprising:
      a plurality of input modules, wherein each of the plurality of input modules comprises a connector, and the connector is configured to receive the input power and is electrically connected to at least a neighboring input module among the plurality of input modules; and
      a plurality of output modules, electrically connected to the plurality of input modules respectively, wherein each of the plurality of output modules has a plurality of output ports, each of the plurality of output modules is configured to receive the input power from the connector of a corresponding input module among the plurality of input modules, or receive the input power from the connector of a neighboring input module neighboring to the corresponding input module, and each of the plurality of output modules is configured to output an output power according to the input power,
   wherein each of the plurality of input modules is configured to adaptively receive the input power chosen from one of the plural types, and the power distribution system is configured to selectively receive one or more times of the input power through one or more of the plurality of input modules to provide one or more times of the output power to one or more of the output ports.

2. The scalable power distribution system according to claim 1, wherein each of the plurality input modules further comprises a slot, the connector of each of the plurality of the input modules is electrically connected to the slot of the neighboring input module so that input modules neighboring to each other are electrically connected to each other, wherein the power distribution system further comprises:
   at least one power distribution panel, configured to provide the input power and is detachably connected to the connector of at least one input module of the plurality of the input modules;
   wherein the at least one power distribution panel is further configured to provide the input power to at least one corresponding output module through the connector connected to the at least one power distribution panel, and the at least one corresponding output module outputs the output power according to the input power.

3. The scalable power distribution system according to claim 2, wherein the plurality of input modules comprise a first input module, the plurality of output modules comprise a first output module, the at least one power distribution panel comprises a first power distribution panel, when the connector of the first input module is electrically connected to the first power distribution panel, the connector of the first input module provides the input power provided by the first power distribution panel to the first output module corresponding to the first input module.

4. The scalable power distribution system according to claim 3, wherein the plurality of input modules further comprise a second input module, the plurality of output modules further comprise a second output module, the at least one power distribution panel further comprises a second power distribution panel, when the connector of the second input module is electrically connected to the second power distribution panel, the connector of the second input module provides the input power provided by the second power distribution panel to the second output module corresponding to the second input module, a total output power of the power distribution system is a sum of the input powers of the first power distribution panel and the second power distribution panel.

5. The scalable power distribution system according to claim 2, further comprising:
   at least one jumper unit, detachably connected to the slot of at least one other input module so as to electrically connect the slot and the connector of the at least one other input module, wherein the jumper unit is configured to form an electrical loop connection between the at least one other input module and at least one neighboring input module neighboring to the at least one other input module, and at least one other output module corresponding to the at least one other input module is configured to receive the input power provided by the at least one neighboring input module.

6. The scalable power distribution system according to claim 5, wherein the plurality of input modules comprise a first input module and a second input module, the plurality of output modules comprise a first output module and a second output module, the at least one power distribution panel comprises a first power distribution panel, the at least one jumper unit comprises a first jumper, and wherein when the connector of the first input module is electrically connected to the first power distribution panel, and the slot of the second input module neighboring to the first input module is electrically to the first jumper unit, the connector of the first input module provides the input power provided by the first power distribution panel to the first output module, and the connector of the second input module and the connector of the first input module form an electrical loop connection through the first jumper unit, and the input power provided by the first power distribution panel is provided to the second output module through the connector of the second input module, a total output power of the power distribution system is the input power of the first power distribution panel.

7. The scalable power distribution system according to claim 6, wherein the plurality of input modules further comprise a third input module, the plurality of output modules further comprise a third output module, and the at least one jumper unit further comprises a second jumper unit, and wherein when the slot of the third input module neighboring to the second input module is electrically connected the second jumper unit, the connector of the third input module and the connector of the first input module form an electrical loop connection through the second jumper unit, the first jumper unit and the connector of the second input module, and the input power provided by the first power distribution panel is provided to the third output module through the connector of the third input module.

8. The scalable power distribution system according to claim 5, wherein the input module neighboring to the at least one other input module connected to the jumper unit is connected to the power distribution panel or the jumper unit.

9. The scalable power distribution system according to claim 5, wherein the input power provided by the power distribution panel is transmitted along a first arrangement direction through one or a plurality of the said jumper units to the connector of one or a plurality of the input modules consecutively neighboring to each other and arranged along the first arrangement direction.

10. The scalable power distribution system according to claim 2, wherein a total output power of the power distribution system is proportional to an amount of the power distribution panels connected to the plurality of input modules.

11. The scalable power distribution system according to claim 2, wherein each of the plurality of output modules only receives the input power from one said power distribution panel.

12. The scalable power distribution system according to claim 2, wherein the power distribution panel is configured to be selectable or replaceable from the plural of types of the input power, and the plural types of input power that can be selected or replaced at least comprise single-phase power, three-phase delta (Delta) power, three-phase star (Y) power and DC power.

13. The scalable power distribution system according to claim 12, wherein when a plurality of the power distribution panels are electrically connected to the plurality of input modules respectively, the input powers of all the plurality of the power distribution panels are of the same type.

14. The scalable power distribution system according to claim 2, wherein an amount of the power distribution panels is equal to or less than an amount of the plurality of output modules.

15. The scalable power distribution system according to claim 1, wherein an amount of the plurality of input modules is equal to the amount of the plurality of output modules.

16. The scalable power distribution system according to claim 1, wherein an amount of the plurality of the input modules and/or an amount of the plurality of output module are determined by at least one of following factors: user design, maximum power requirement of an application scenario, power specification of the power distribution system, power specifications of the external electrical devices connected to the power distribution system, and power specification of the input power.

17. A power distribution method, characterized by comprising:

providing a power distribution system comprising a power distribution device, wherein the power distribution device comprises a plurality of input modules and a plurality of output modules correspondingly, and each of the plurality of input module comprises a connector, the connector is electrically connected to a neighboring input module among the plurality of input modules;

receiving an input power by the connector of at least one input module of the plurality of input modules;

receiving, by at least one corresponding output module of the plurality of output modules, the input power from the connector of the at least one input module or the input power from the connector of the neighboring input module neighboring to the at least one input module; and providing, by the at least one corresponding output module, an output power according to the input power, wherein the input power is of one type adaptively chosen from plural types, and selectively received by one or more of the plurality of input modules in one or more times so as to provide one or more times of the output power to one or more of the plurality of output modules.

18. The power distribution method according to claim 17, further comprising:

providing at least one power distribution panel detachably connected to the connector of the at least one of the plurality of the input modules so as to provide the input power; and providing, by the connector connecting to the at least one power distribution panel, the input power to the corresponding output module so that the corresponding output module outputs the output power according to the input power.

19. The power distribution method according to claim 18, wherein the plurality of input modules comprises a first input module, the plurality of output modules comprises a first output module, and the at least one power distribution panel comprises a first power distribution panel, wherein the power distribution method further comprises:

provyding, by the connector of the first input module, the input power provided by the first power distribution panel to the first output module.

20. The power distribution method according to claim 19, wherein the plurality of input modules further comprises a second input module, the plurality of output modules further comprises a second output module, and the at least one power distribution panel further comprises a second power distribution panel, wherein the power distribution method further comprises:

providing, by the connector of the second input module, the input power provided by the second power distribution panel to the second output module,
wherein a total output power of the power distribution system is a sum of the input powers of the first power distribution panel and the second power distribution panel.

21. The power distribution method according to claim 18, further comprising:

providing at least one jumper unit detachably connected to the slot of at least one other input module of the plurality of input modules so as to electrically connect the slot and the connector of the at least one other input module;

forming an electrical loop connection, by the jumper unit, between the at least one other input module and at least one neighboring input module neighboring to the at least one other input module; and receiving the input power from the at least one neighboring input module by the at least one other input module.

22. The power distribution method according to claim 21, wherein the plurality of input modules comprises a first input module and a second input module, the plurality of output modules comprises a first output module and a second output module, the at least one power distribution panel comprises a first power distribution panel, and the jumper unit comprises a first jumper unit, wherein the power distribution method further comprises:

providing the input power from the first power distribution panel to the first output module by the connector of the first input module;

forming an electrical loop connection between the connector of the second input module and the connector of the first input module through the first jumper unit; and providing the input power from the first power distribution panel to the second output module through the connector of the second input module, wherein a total output power of the power distribution system is the input power of the first power distribution panel.

23. The power distribution method according to claim 22, wherein the plurality of input modules further comprises a third input modules, the plurality of output modules further comprises a third output module, and the jumper unit further comprises a second jumper unit, wherein the power distribution method further comprises:

utilizing the connector of the third input module and the connector of the first input module to form another electrical loop connection between the connector of the third input module and the connector of the first input module through the second jumper unit, the first jumper unit and the connector of the second input module; and providing the input power from the first power distribution panel to the third output module through the connector of the third input module.

* * * * *